United States Patent
Boyd

[19]

[11] Patent Number: 6,158,385
[45] Date of Patent: Dec. 12, 2000

[54] BIRD FEEDER WITH ELECTRONIC SQUIRREL DETERRENCE

[75] Inventor: Randal D. Boyd, Knoxville, Tenn.

[73] Assignee: Radio Systems Corporation, Knoxville, Tenn.

[21] Appl. No.: 09/190,466

[22] Filed: Nov. 12, 1998

[51] Int. Cl.$^7$ .................................................. A01K 39/01
[52] U.S. Cl. .......................................... 119/52.3; 119/57.9
[58] Field of Search .................................. 119/52.3, 52.4, 119/57.9, 52.2, 57.8, 63

[56] References Cited

U.S. PATENT DOCUMENTS

| | | |
|---|---|---|
| 1,005,071 | 10/1911 | Randall . |
| 1,222,389 | 4/1917 | Goelzer . |
| 2,856,898 | 10/1958 | Doubledag et al. . |
| 2,884,899 | 5/1959 | Jackes et al. . |
| 3,568,641 | 3/1971 | Kilham . |
| 4,188,913 | 2/1980 | Earl et al. . |
| 4,259,927 | 4/1981 | Clarke . |
| 4,327,669 | 5/1982 | Blasbalg . |
| 5,150,665 | 9/1992 | Boaz . |
| 5,191,857 | 3/1993 | Boaz . |
| 5,285,747 | 2/1994 | Caldine .................................. 119/57.9 |
| 5,353,744 | 10/1994 | Custer ..................................... 119/719 |
| 5,460,124 | 10/1995 | Grimsley et al. ........................ 119/721 |
| 5,471,951 | 12/1995 | Collins .................................... 119/57.9 |
| 5,494,002 | 2/1996 | Breene . |
| 5,676,089 | 10/1997 | Morganson ............................. 119/52.3 |
| 5,864,292 | 1/1999 | Roestenberg et al. .................. 119/52.3 |
| 5,937,788 | 8/1999 | Boyd ....................................... 119/57.9 |

OTHER PUBLICATIONS

Sky Mall Magazine—Christmas Holiday 1997—Electronic Bird Feeder, p. 101—advertisment.

*Primary Examiner*—Peter M. Poon
*Assistant Examiner*—Yvonne R. Abbott
*Attorney, Agent, or Firm*—Pitts & Brittian, P.C.

[57] ABSTRACT

A bird feeder with electronic squirrel deterrence that includes a bottom, a top, a swivelling hanger, a reservoir for storing bird feed and at least one feeding opening disposed in the reservoir. Feeding roosts having a perch are received in the feeding openings and inserts, having selectively sized beak openings and selectively sized feed baffles are received by the feeding roosts in order to accommodate birds of various species. In one embodiment, the bird feeder includes correction circuit for administering an electrostatic shock to a squirrel. The roost, the bottom, and the top include conductive surfaces which form an open circuit. The circuit is closed when an animal such as a squirrel makes contact with the conductive surfaces and one of the feeding roosts and delivers a mild electrical shock to the animal. Another embodiment, includes a correction circuit configured to generate a loud, ultrasonic sound when an animal closes an open circuit by either contacting two surfaces having differing voltage potentials or by having sufficient weight to close a switch biased by a spring.

10 Claims, 7 Drawing Sheets

BIRD FEEDER WITH ELECTRONIC SQUIRREL DETERRENCE

TECHNICAL FIELD

This invention relates to the field of bird feeders. More particularly, it relates to a bird feeder designed so as to prevent squirrels from feeding therefrom.

BACKGROUND ART

Wild bird feeding, via the hanging of bird feeders, has become a popular hobby activity. Bird feeders are often strategically placed so as to attract various species of birds to a spot where they may be conveniently observed. Indeed, more often than not, the provider of the bird feeder is more motivated by observing the birds than by simply providing wild creatures an alternate and convenient food source. For this reason, most bird enthusiasts generally prefer to provide feed for birds rather than other, larger, animals.

Because of its voracious appetite, the squirrel is the bane of most bird-feeding enthusiasts. The art is replete with feeders that have attempted to prevent squirrels from stealing the bird seed. However, the squirrel has displayed a remarkable ability to foil efforts at preventing it from obtaining a free meal. For instance, it has been observed that a squirrel will approach a feeder from the top and hang upside down in order to feed.

Other devices have been disclosed for the feeding of birds. Typical of the art are those devices disclosed in the following U.S. Patents:

| U.S. Pat. No. | Inventor(s) | Issue Date |
|---|---|---|
| 1,005,071 | Randall | Oct. 3, 1911 |
| 1,222,369 | Goelzer | Apr. 10, 1917 |
| 2,884,899 | Jackes | May 5, 1959 |
| 3,568,641 | Kilham | March 9, 1971 |
| 4,188,913 | Earl et al. | Feb. 19, 1980 |
| 4,259,927 | Clarke | Apr. 7, 1981 |
| 4,327,669 | Blasbalg | May 4, 1982 |
| 5,150,665 | Boaz | Sept. 29, 1992 |

U.S. Pat. No. 5,150,665, issued to Boaz on Sep. 29, 1992, discloses a bird feeder that has a curved top intended to make it difficult for a squirrel to rest on the top and that incorporates an electrical circuit designed to provide a mild, non-injuring shock to a squirrel in order to discourage the squirrel from feeding. Other known bird feeders in this art are referenced above.

What has been missing from the art is a squirrel-proof bird feeder that includes selectively sized inserts to selectively accommodate birds of various sizes and that includes a plurality of electrodes for providing a mild, non-injurious electrical shock to a squirrel attempting to feed while holding on to any of the various surfaces on the bird feeder and that positively discourages a squirrel from resting on the top via a mild electric shock.

Accordingly, it is an object of the present invention to provide a bird feeder that prevents squirrels from feeding therefrom by providing a plurality of electrodes that provide a mild, non-injuring shock to the squirrel.

Another object of the present invention is to provide a bird feeder having a top that includes electrodes in order to prevent the squirrel from resting on the top of the feeder.

Yet another object of the present invention is to provide a bird feeder which includes conductive surfaces providing more than one voltage potential to minimize the number of places on the bird feeder from which a squirrel might rest without receiving a correction.

A further object of the present invention is to provide a bird feeder that includes a plurality of inserts having selectively sized openings to optionally accommodate birds of various species at a single feeder.

Yet a still further object of the present invention is to provide a bird feeder that has a hanger/handle and top adapted such that when the top is affixed to the bird feeder, the handle is prevented from swivelling and when the top is lifted, the handle and top swivel away from the open end so as to facilitate refilling.

Continuing further, another object of the present invention is to provide a bird feeder that prevents squirrels from feeding therefrom by producing a loud ultrasonic sound that is irritating to squirrels and yet unoffensive to birds.

Other objects and advantages over the prior art will become apparent to those skilled in the art upon reading the detailed description. together with the drawings as described as follows.

DISCLOSURE OF THE INVENTION

In accordance with the various features of this invention, a bird feeder with electronic squirrel deterrence is provided. The bird feeder includes a bottom, a top, a swivelling handle, a reservoir for storing bird feed, and at least one feeding opening disposed in the sidewalls of the reservoir. Conductive feeding roosts having differing voltage potentials are received in the feeding openings. The feeding opening closely receives an insert having at least one selectively sized beak opening and at least one selectively sized feed baffle in order to accommodate birds of various species. Further, the bottom and the top include conductive surfaces. The feeding roosts and the conductive surfaces on the top and the bottom are in an open electronic circuit. The circuit is closed when a squirrel makes contact between two conductors having differing potentials, including a conductive surface and a feeding roost, two conductive surfaces, or two feeding roosts. When closed, the circuit delivers a mild electrical shock to the squirrel. In the preferred embodiment, the top has a plurality of conductive surfaces which have differing voltage potentials. The conductive surfaces are selectively spaced such that a squirrel at rest on the top closes the open circuit and is subsequently shocked while at rest on the top.

An alternate embodiment, rather than producing an electrical shock, the bird feeder produces a loud ultrasonic sound to deter squirrels from foraging at the bird feeder. In this regard, switches are provided that are activated by the weight of a squirrel but not by the average-sized bird. Upon detection of a squirrel an electronic circuit, in conjunction with a piezoelectric sounder, produces an ultrasonic sound in the 25 KHz range. In one embodiment, an electrical switch is provided in each perch, with the perch being spring biased away from the contact switch.

BRIEF DESCRIPTION OF THE DRAWINGS

The above-mentioned features of the invention will become more clearly understood from the following detailed description of the invention read together with the drawings in which.

BEST MODE FOR CARRYING OUT THE INVENTION

A bird feeder that includes electronic squirrel deterrence, constructed in accordance with the present invention, is illustrated generally as 10 in the figures. The bird feeder is provided to allow birds to feed from bird feed stored within the bird feeder, while discouraging other undesired animals, particularly squirrels, from stealing the bird feed by delivering an unpleasant stimulus, such as a electrostatic shock or a loud ultrasonic deterrent, to the undesired animal. Various conductive points, having one of a predetermined number of voltage potentials, are provided on the bird feeder where the undesired animal is likely to make conduct thereby completing a normally-open circuit and activating the deterrent.

Figure 1:
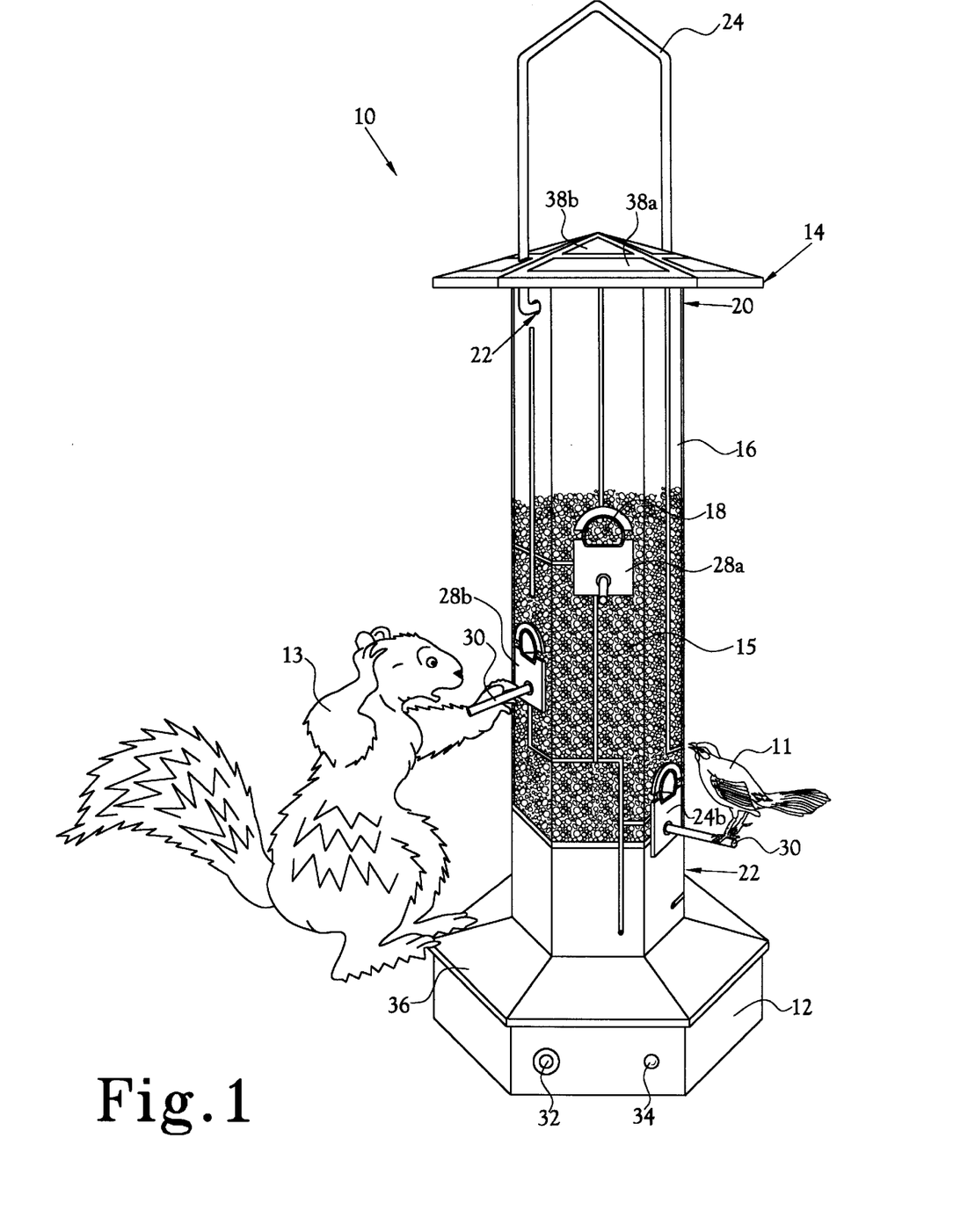
FIG. 1 illustrates a perspective view of the bird feeder of the present invention.

Referring to FIG. 1, the bird feeder 10 includes a bottom 12, a lid 14, and a reservoir 16 for storing the bird feed 15. The reservoir 16 defines an upper end 18 which closely receives the lid 14 and a lower end 20 connected to the bottom 12. A pair of handle openings 22 are defined by the upper end 20 of the reservoir 16 for receiving a handle member 24. The handle member 24 serves to support the bird feeder 10 while hanging and while being carried. The reservoir 16 further includes at least one feeding roost 28. Each feeding roost 28 includes a conductive perch 30. The bottom 12 includes a power switch 32 and a visual indicator 34. The bottom 12 further includes a plurality of conductive bottom plates 36 secured to the top surface of the bottom 12.

Figure 2A:
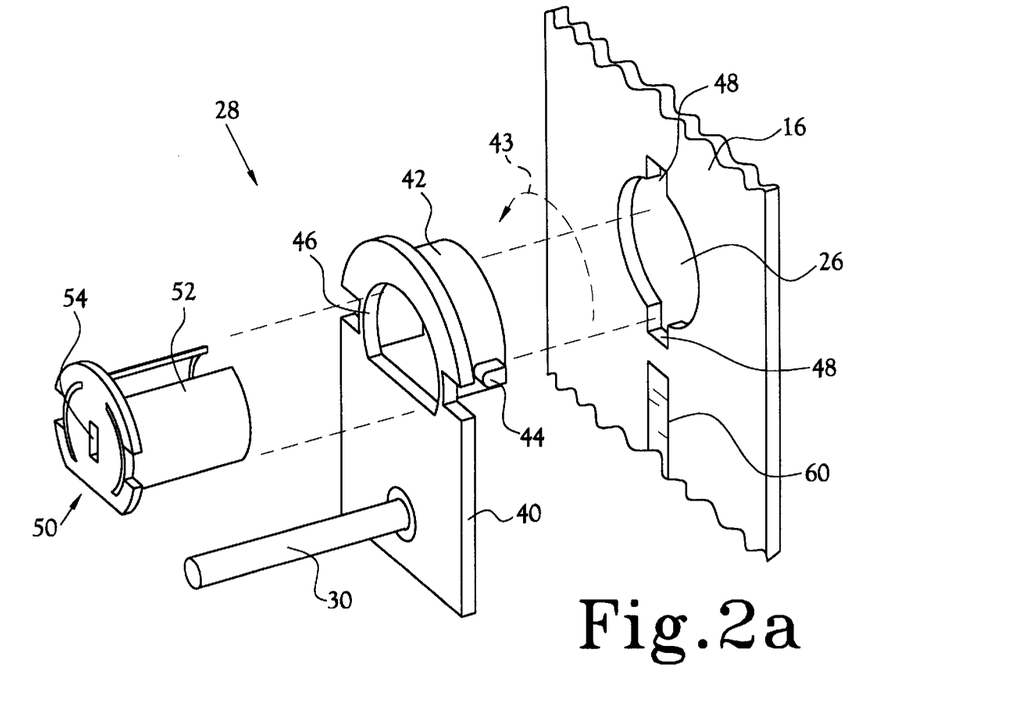
FIGS. 2a and 2b show exploded views of the keyed feed openings with the keyed feeding roosts and species selective inserts with portions of the bird feeder cut away for clarity.
Figure 2B:
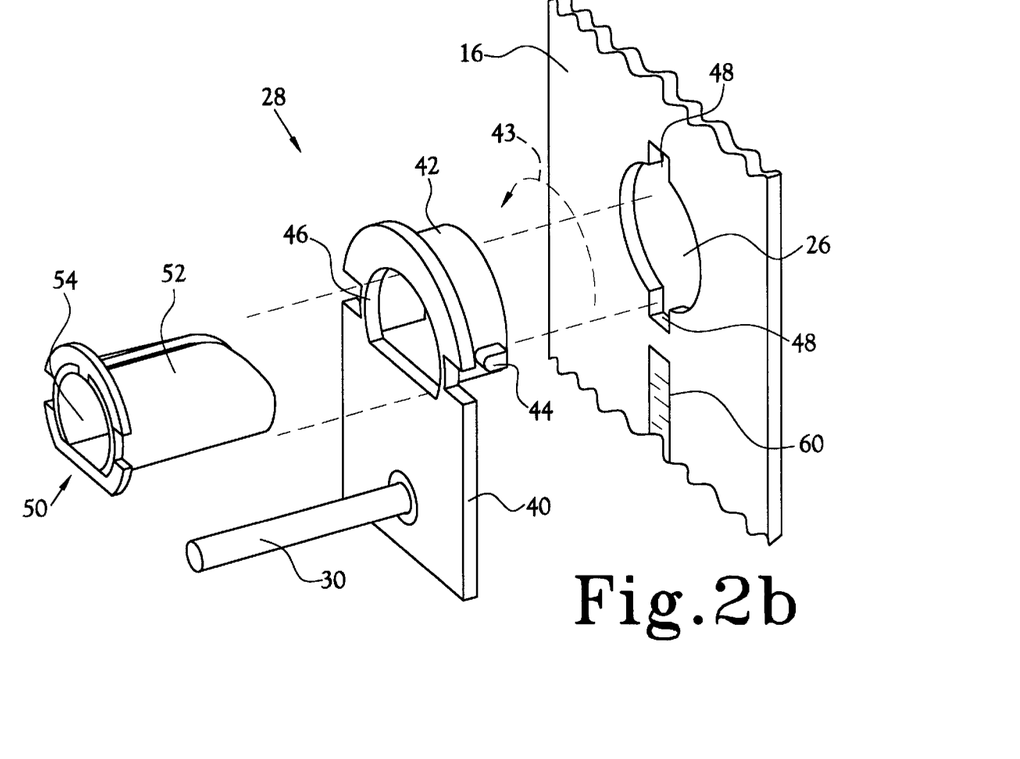

Referring to FIGS. 2a and 2b, the relationship between the feeding opening 26 and the feeding roost 28 is illustrated. In this regard, the feeding roost 28 includes a cover plate 40 and a shoulder 42. The shoulder 42 has the same geometric configuration as the feeding opening 26. The feeding opening 26 and the shoulder 42 are dimensioned and configured so as to allow the shoulder 42 to be received by the feeding opening 26 in a tight, frictional fit and to allow the shoulder 42 to rotate within the feeding opening 26 as shown by arrow 43.

The cover plate 40 and the shoulder 42 define a roost opening 46 which is axially oriented through the shoulder 42. The shoulder 42 further defines at least one key 44 which registers with at least one keyway 48 defined by reservoir 16, in order to lock the feeding roost 28 into place within feeding opening 26. In the illustrated embodiment, a pair of keyways 48 with matching keys 44 is shown. To secure the feeding roost 28 within the feeding opening 26, the feeding roost 28 is rotated, as shown by arrow 43, until the key 44 registers with the keyway 48. The feeding roost 28 is then inserted into the feeding opening 26 and rotated back into its normal attitude. Removal is accomplished by reversing this process. An insert 50 is tightly, and frictionally, received by the roost opening 46 and defines selectively sized beak openings 54 for accommodating birds 11 of various species. The insert 50 further includes selectively sized feed baffles 52 for channeling the bird seed 15 to the beak openings 54.

Figure 3:
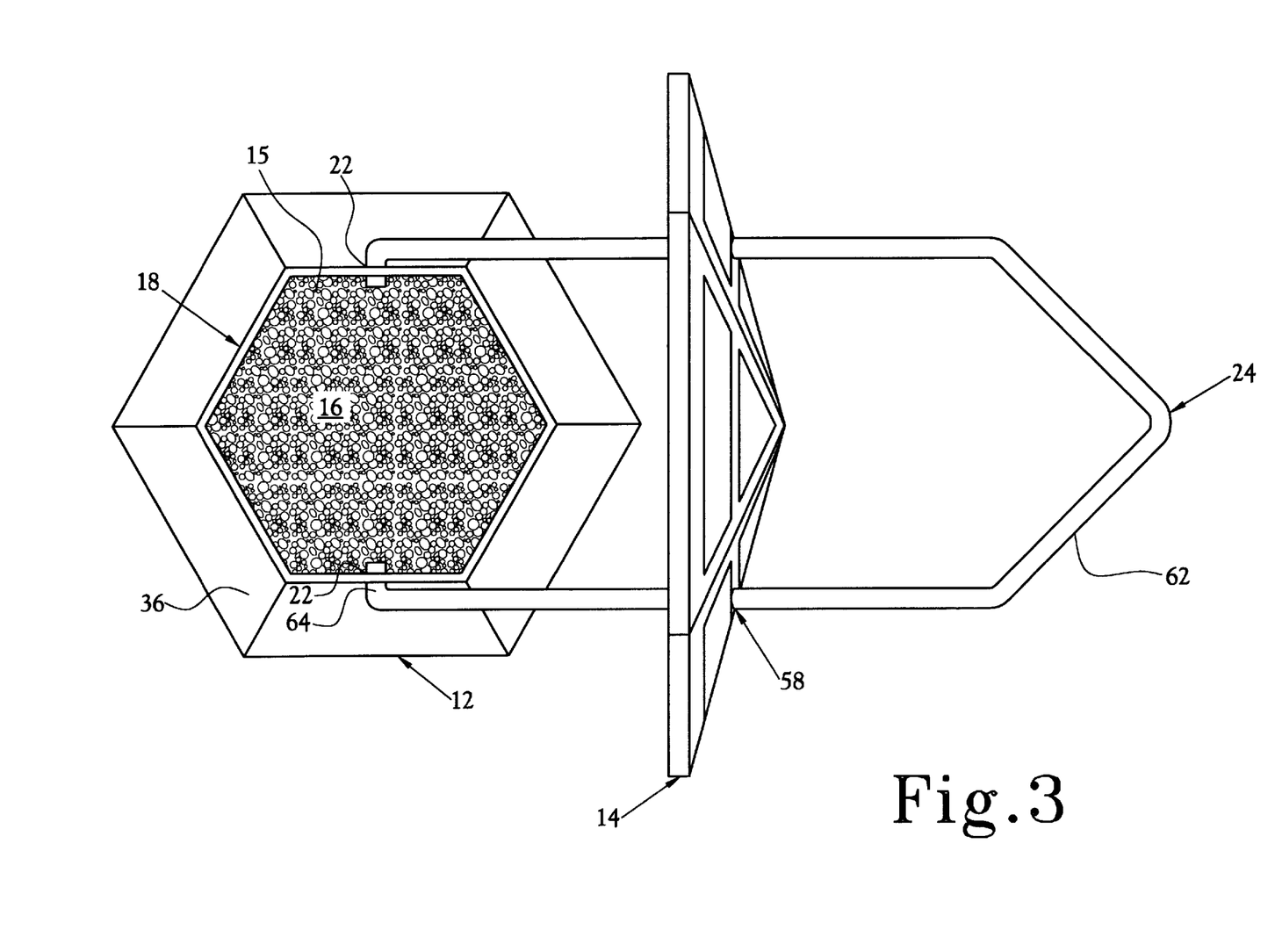
FIG. 3 shows the top of the feeder and the pivotal handle in the open position for filling the bird feeder.

Referring now to FIG. 3, the relationship between the lid 14, the handle member 24, and the reservoir 16 is illustrated in greater detail. The handle member 24 includes a substantially "U"-shaped member having a pair of vertical segments 62 which extend through the lid openings 58. Further, the termini of the "U"-shaped member each define a lateral segment 64 which is received by a handle opening 22 defined by the reservoir 16. In the preferred embodiment, the lid openings 58 are disposed above the handle openings 22 such that when the lid 14 is positioned on the upper end 34 of the reservoir 16, the handle member 24 is prevented from rotating. As in the illustrated embodiment, the lid 14 is lifted from the reservoir 16 in order to replenish the supply of bird seed 15. This allows the handle member 24 to swivel within the handle openings 22 at the point of engagement between the lateral segments 64 and the reservoir 16.

Figures 4, 7:
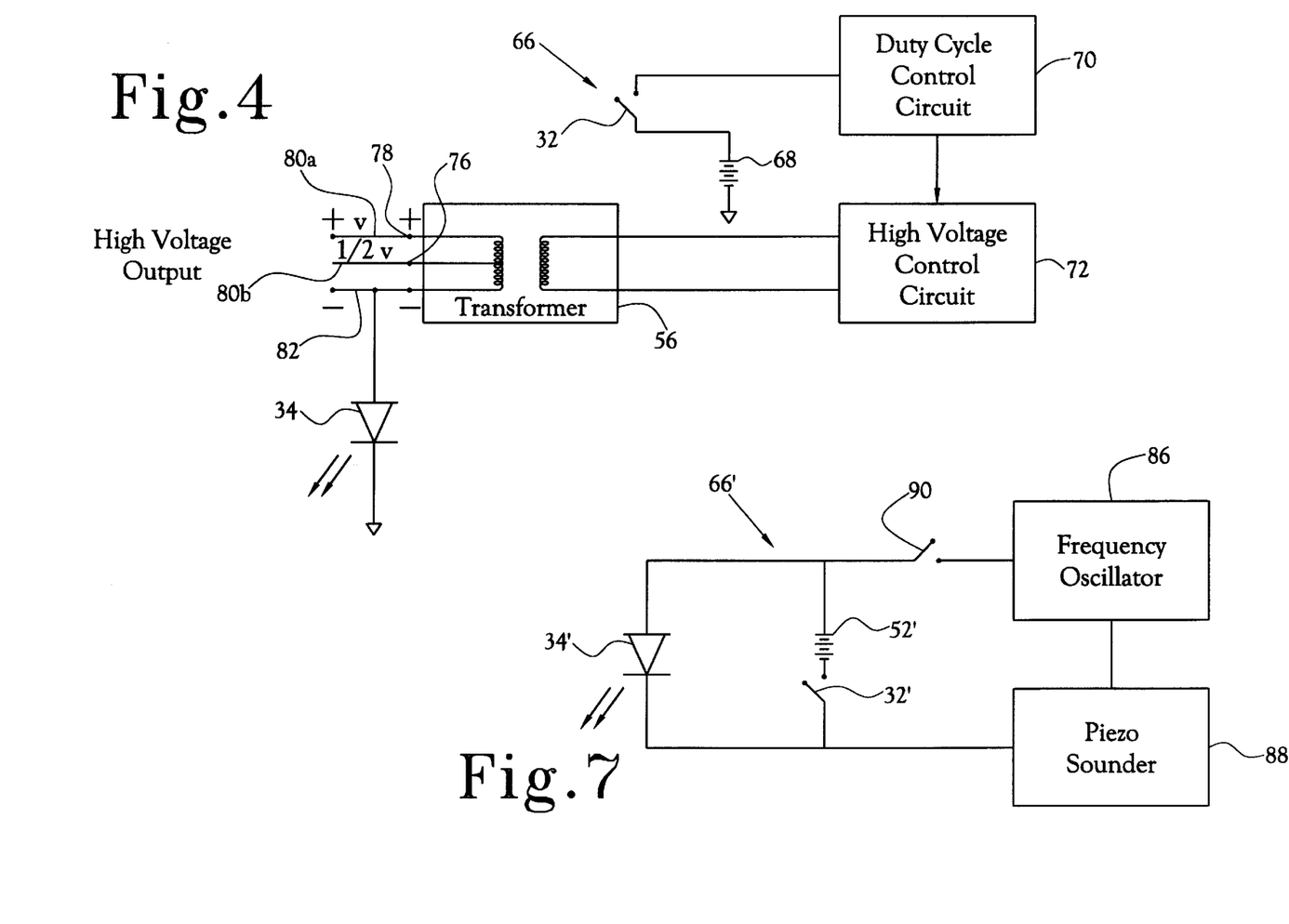
FIG. 4 is a schematic illustration of the correction circuit which generates an electrostatic shock deterrent.
FIG. 7 is a schematic illustration of an alternate correction circuit which generates an ultrasonic sound deterrent.

The bird feeder 10 also includes an correction circuit 66, illustrated in FIG. 4, for preventing larger animals, such as the squirrel 13 from robbing the bird feeder 10 of its bird feed 15. In operation, the correction circuit 66 increases the voltage of a low voltage power supply 68 to a voltage which is effective to serve as a correction. The circuit 66 and the power supply 68 are preferably housed in the bottom 12 and can be removed as a unit for repair or replacement, thus allowing the bird feeder 10 to remain in service. The correction circuit 66 includes a power supply 68, a duty cycle control circuit 70, a high voltage control circuit 72 and a transformer 74. The transformer 74 includes at least one center tap 76 on the low voltage side 78 thereof for increasing the number of voltage potentials present within the correction circuit 66. In the preferred embodiment, the correction circuit 66 also includes a power switch 32 and a visual indicator 34 for indicating power status to the correction circuit 66. In the illustrated embodiment, the visual indicator 34 is a light emitting diode. One skilled in the art will recognize that other visual indicators 34 could be used. Current is delivered to the bird feeder 10 via at least one positive conductor 80 and a negative conductor 82. In the preferred embodiment, the negative, or ground, conductor 82 is in direct electrical connection with the conductive bottom plates 36. Further, each conductive roost 28 is in direct electrical contact with one positive conductor 80a or 80b such that each conductive roost 28 is selectively biased with one of the voltages produced by the correction circuit 66. One skilled in the art will recognize that the magnitude and polarity of the voltage connected to either the bottoms plate 36 or the feeding roosts 28 may vary to achieve a specific deterrent setup. In the illustrated embodiment, a first positive conductor 80a is connected to the positive terminal 78 of the transformer 74. This arrangement creates an open circuit between the first positive conductor 80a and the negative conductor 82. The resulting open circuit has a voltage potential equal to the full voltage of the corrective circuit 66 between the conductive roost 28 and the conductive bottom plate 36. Similarly, second positive conductor 80b is connected to the center tap 76 of the transformer 74. As before, this arrangement creates an open circuit having a voltage potential approximately equal to one half of the full voltage between the second positive conductor 80b and the negative conductor 82. One skilled in the art will recognize that any number of center taps could be used to produce multiple unique voltage potentials as desired.

The electronic circuit 66 is constructed so as to create an open circuit between the conductive bottom plates 36 and the feeding roosts 28. Of course, the bird 11 resting on the feeding roost 28 to feed will not close the circuit and can feed uninterrupted and undeterred. However, the squirrel 13 attempting to stand on the bottom 12 must touch at least one of the conductive bottom plates 36 and a feeding roost 28 in order to feed. This will close the circuit, thus shocking the squirrel 13. Further, should the squirrel 13 attempt to hang between two feeding roosts 28 thereby avoiding the conductive bottom plates 36, the corrective circuit 66 is similarly closed and the squirrel 13 will receive an electrostatic shock of one half of the full voltage for the corrective circuit 66.

Figure 5:
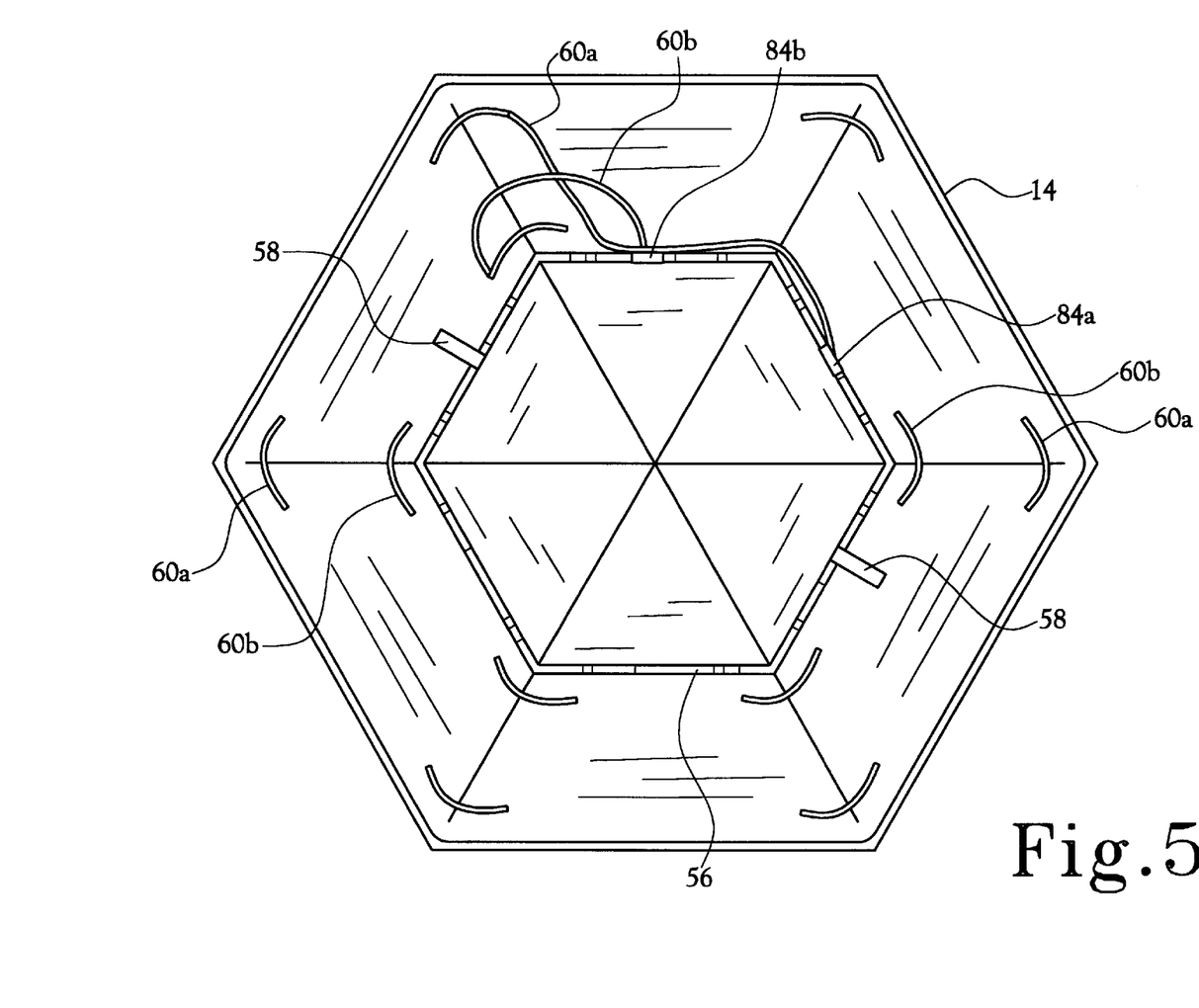
FIG. 5 shows a bottom view of the bird feeder top showing the recess for receiving the top of the bird feeder.
Figure 6A:
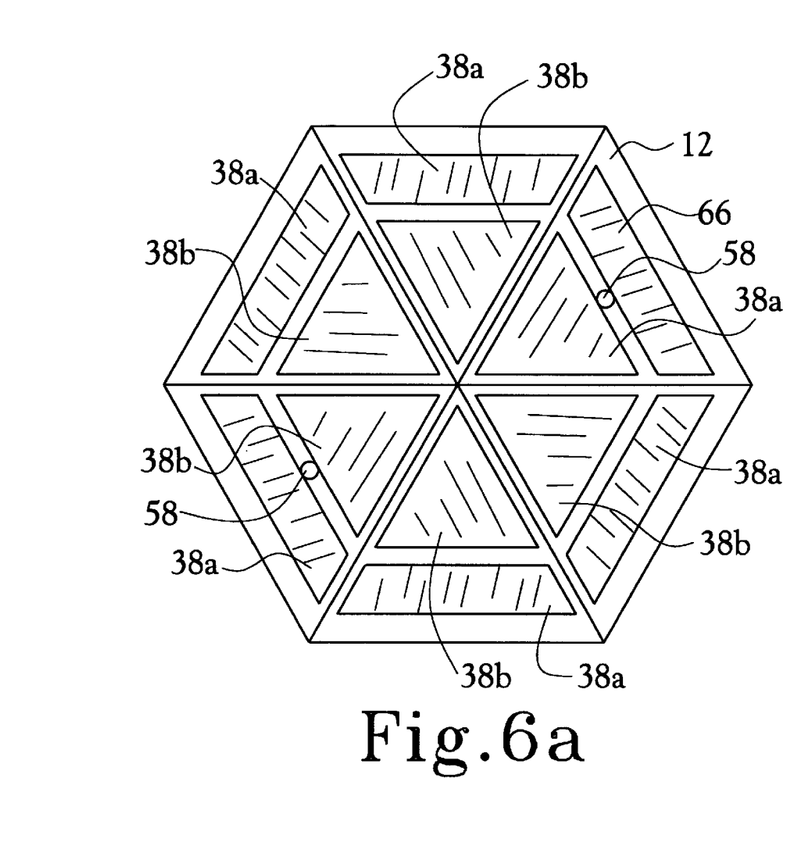
FIGS. 6a and 6b are top plan views of the bird feeder lid showing alternate embodiments of the conductive regions for preventing a squirrel from resting on the top of the feeder.

Examining the relationship of the conductive parts of the bird feeder 10 in greater detail, FIG. 5 illustrates a bottom plan view of the lid 14 showing a lip 56 that engages the upper end 18 of the reservoir 16 in a tight, frictional engagement that seals the reservoir 32 and substantially protects the bird seed 15 stored therein from the elements. A pair of contacts 84a and 84b serve to separately connect the lid plates 38 on the opposing side of the lid 14 to either the positive conductor 80 or the negative conductor 82 via the conductors 60a and 60b FIG. 6a, further illustrates relation of the conductive lid plates 38a and 38b to the correction circuit 66. The plurality of conductive lid plates 38a and 38b are in electrical contact with the conductors 80 and 82 such that there is an open circuit between the lid plates 38a and 38b. One skilled in the art will recognize that the magnitude and polarity of the voltage connected to the lid plates 38 may vary to achieve a specific deterrent setup. A squirrel 13 that attempts to rest on the lid 14 and comes in contact with at least one of each group of lid plates 38a and 38b will close the circuit correction circuit 66 and will thereby be shocked.

Figure 6B:
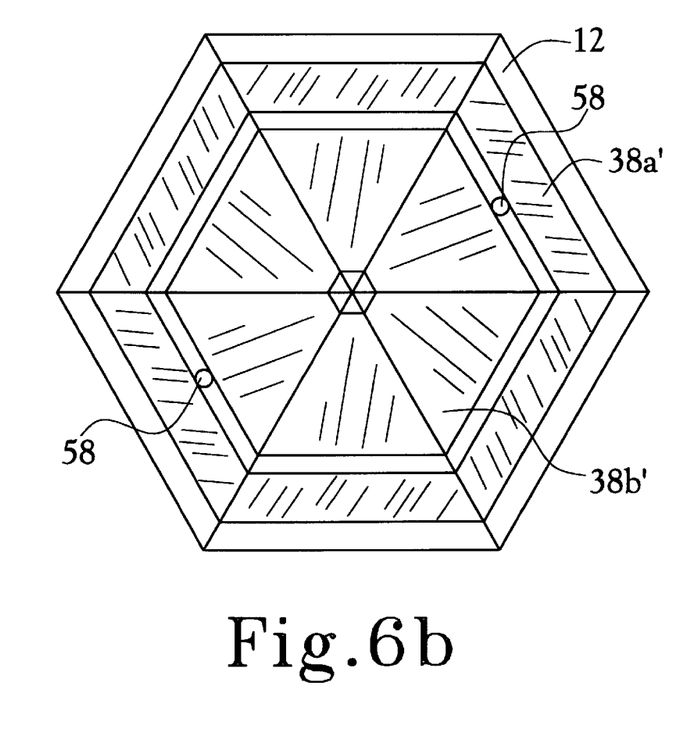

FIG. 6b shows an alternate embodiment in which the lid 14' has a single conductive lid plate 38a', disposed centrally, and a single conductive lid plate 38b', disposed around the perimeter of the lid 14'. A gap exists between the lid plates 38a' and 38b' such that they form an open circuit. In the preferred embodiment of the bird feeder 10, the polarity of either conductive lid plate 38a or 38a' is negative such that an open circuit exists between surface 38a or 38a' and the feeding roosts 28. Thus, even if the squirrel 13 manages to hang from the edge of the lid 14', it will close a circuit and be shocked upon grasping a feeding roost 28. One skilled in the art will recognize that other corrective stimuli could be used, such as an ultrasonic tone, in place of the high voltage electrostatic shock without interfering with the objects of the present invention.

Figure 8:
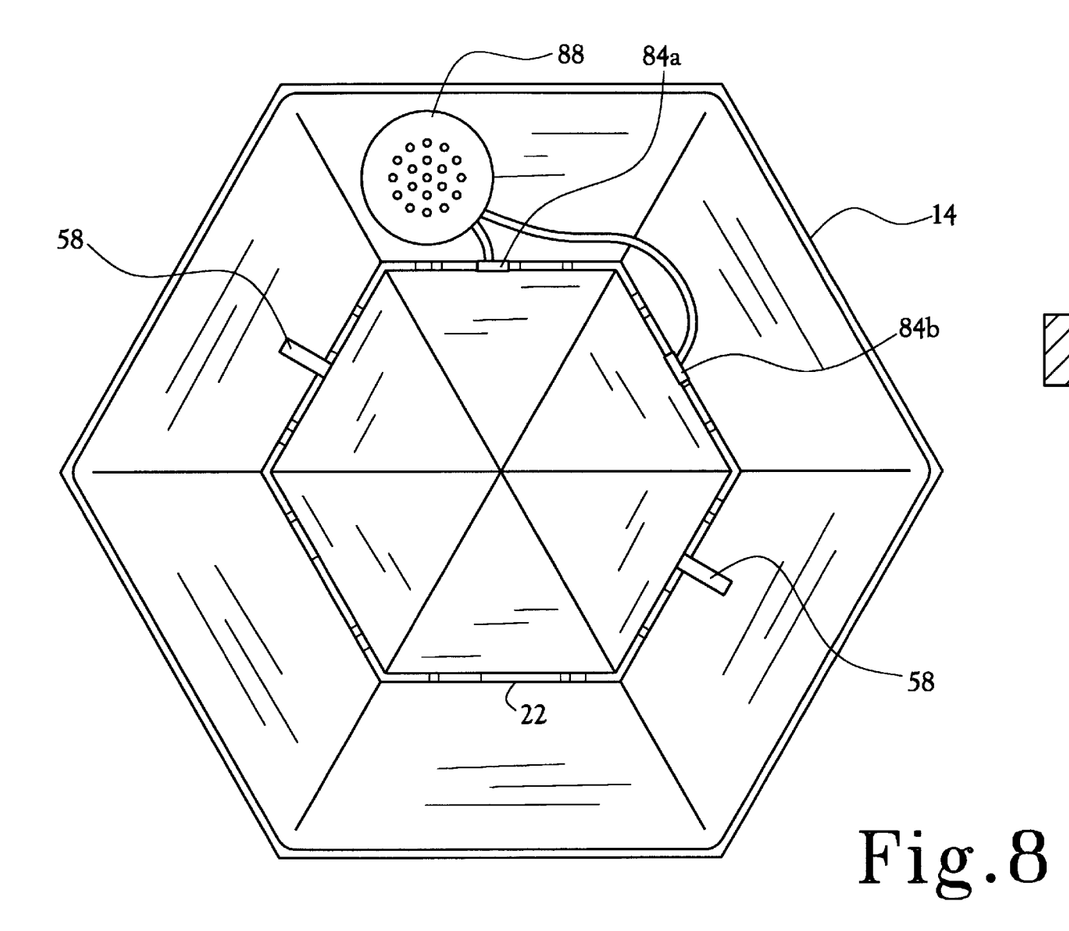
FIG. 8 is a bottom plan view of an alternate embodiment of the bird feeder lid having a piezoelectric sounder.
Figure 9:
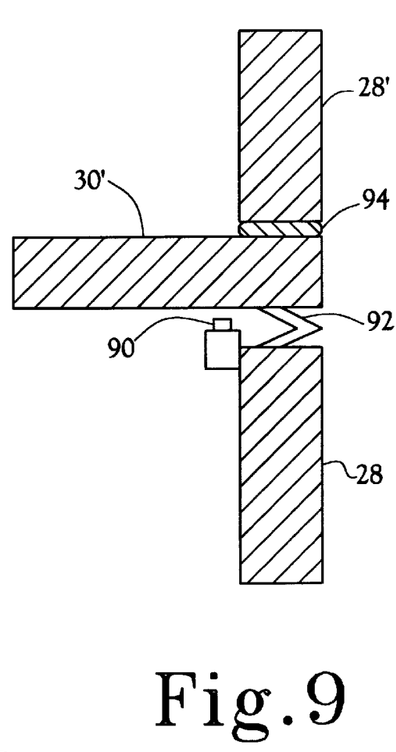
FIG. 9 is a side elevation view, in section, of an alternate embodiment of the feeding roost and perch showing the spring biasing of the perch away from the contact switch.

Referring to FIGS. 7, 8 and 9, an alternate embodiment is illustrated with common components bearing the same reference numerals. Comparable but distinctive parts bear the same reference numeral with the prime notation added. In the alternate embodiment, squirrels are deterred from foraging at the bird feeder by a loud ultrasonic sound in the 25 KHz range. In this regard the correction circuit 66' generates a loud, ultrasonic sound in the 25 KHz range. The circuitry and the power supply are preferably disposed within the bottom 12 and can be removed as a unit for repair or replacement, thus allowing the bird feeder 10 to remain in service. The correction circuit 66' includes a power supply 68, a frequency oscillator 86, a piezoelectric-electric sounder 88, and a switch 90. The correction circuit 66' preferably includes a power switch 32' and a visual indicator 34' for indicating the power status of the correction circuit 66'. The piezoelectric-electric sounder 88 is preferably mounted on the lower side of lid 14'. Current is delivered to the piezoelectric-electric sounder 88 through conventional wiring which engages contacts 84a' and 84b'. While those skilled in the art will appreciate that the switch 90 can be mounted on the upper surface of the bottom 12, the preferred configuration utilizes a spring biased perch 30'. In this regard the perch 30' is pivotally received in the feeding roost 28' and is biased in the horizontal position by a spring member 92. The spring 92 is chosen so as to maintain perch 30' in the horizontal position against the weight of the bird 11. However, when the squirrel 13 places weight on the perch 30', the perch 30' pivots downward and engages the switch 90. In order to assist in holding the perch 30' within the feeding roost 28' a compressible grommet 94 can be utilized.

From the foregoing description, it will be recognized by those skilled in the art that a bird feeder that prevents squirrels from feeding therefrom offering advantages over the prior art has been provided. Specifically, the bird feeder provides a plurality of electrodes that provide a mild, non-injuring shock to the squirrel. Additionally, the bird feeder of the present invention provides a top that includes electrodes in order to prevent the squirrel from resting on the top of the feeder. Further, the electrodes are biased such that multiple voltage potentials are present to minimize the places upon the bird feed where the squirrel can rest without receiving a correction. The bird feeder of the present invention will optionally accommodate birds of various sizes at different roosts and provides a hanger/handle and top adapted such that when the top is affixed to the bird feeder the handle is prevented from swivelling and when the top is lifted, the handle and top swivel away from the open end so as to facilitate refilling.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A bird feeder for feeding birds and for deterring squirrels from feeding therefrom, said bird feeder comprising:

a reservoir for holding bird seed, said reservoir having an upper end and a lower end;

a lid member for sealing said upper end of said reservoir, said lid member including a continuous lip member adapted so as to engage said upper end of said reservoir;

a plurality of conductive lid plates secured to an upper surface of said lid member;

at least one feeding opening defined by said reservoir for providing access to the bird feed;

at least one feeding roost engaged with each of said at least one feeding opening, said at least one feeding roost defining a roost opening in register with one of said at least one feeding openings and further having a conductive perch;

a bottom member defining a chamber, said bottom member disposed proximate said lower end of said reservoir;

at least one conductive bottom plate secured to an upper surface of said bottom member;

a correction circuit disposed in said chamber of said bottom member;

a power supply electrically connected to said correction circuit; and a high voltage transformer having at least two positive conductors and a negative conductor, said high voltage transformer having a negative terminal and at least two positive terminals, each of said at least two positive terminals having a unique voltage output magnitude, and wherein said feeding roosts are divided into at least two groups of said feeding roosts, each of said at least two positive conductors being placed in conductive contact between one of said at least two groups of said feeding roosts and one of said at least two positive terminals whereby each of said feeding roosts is selectively biased with a voltage, said negative conductor being placed in conductive contact between each of said at least one conductive bottom plates and said negative terminal such that an open circuit is formed between each of said feeding roosts and each of said conductive bottom plates and between each of said two groups of said feeding roosts.

2. The bird feeder of claim 1 wherein said correction circuit includes a high voltage transformer, at least one positive conductor, and a negative conductor, said high voltage transformer having a negative terminal and at least one positive terminal, said at least one positive conductor being placed in conductive contact with each of said feeding roosts and said at least one positive terminal whereby each of said feeding roosts is biased with a voltage, said negative conductor being placed in conductive contact between each of said at least one conductive bottom plates and said negative terminal such that an open circuit is formed between each of said feeding roosts and each of said conductive bottom plates.

3. The bird feeder of claim 1 wherein said plurality of conductive lid plates are divided into at least a first group of conductive lid plates and a unique second group of conductive lid plates, said negative terminal being placed in conductive contact with said first group of conductive lid plates and one of said at least two positive conductors being placed in conductive contact with said second group of conductive lid plates such that an open circuit is formed between said first group of conductive lid plates and said second group of conductive lid plates and an open circuit is formed between said first group of conductive lid plates and each of said feeding roosts.

4. The bird feeder of claim 1 wherein said bird feeder further comprises a plurality of inserts adapted to be received by said roost openings in said feeding roosts, each said insert having at least one beak opening disposed therein, said at least one beak opening being adapted for selectively varying access to said feed opening.

5. The bird feeder of claim 4 wherein each of said plurality of inserts engage each of said feeding roosts in a tight, frictional engagement.

6. The bird feeder of claim 4 wherein each of said plurality of inserts include a feed baffle adapted to allow access to bird feed of a selected size.

7. The bird feeder of claim 1 wherein said feeding opening is configured to allow rotation of said feeding roost therein, said feeding opening including at least one keyway and said feeding roost including a rearwardly disposed shoulder member and at least one key disposed on said shoulder, said at least one keyway and said at least one key disposed in unique orientations such that said feeding roost must be rotated to allow said key to register with said keyway and said feeding roost inserted into said feeding opening and rotated into an operative position thereby rotatably locking said feeding roost into said feeding opening.

8. The bird feeder of claim 1 wherein said upper end of said reservoir defines a pair of handle openings, said bird feeder further comprising a handle member received by said pair of handle openings.

9. The bird feeder of claim 8 wherein said handle member further comprises a pair of elongated vertical members, each vertical member terminating in a lateral segment, wherein said vertical members extend through a pair of lid openings defined by said lid member and wherein said lateral segments are received by said handle openings defined by said reservoir.

10. The bird feeder of claim 1 wherein said correction circuit is removably disposed within said bottom member, thus allowing said bird feeder to be in use during repair or replacement of said correction circuit.

* * * * *